United States Patent Office 3,291,776
Patented Dec. 13, 1966

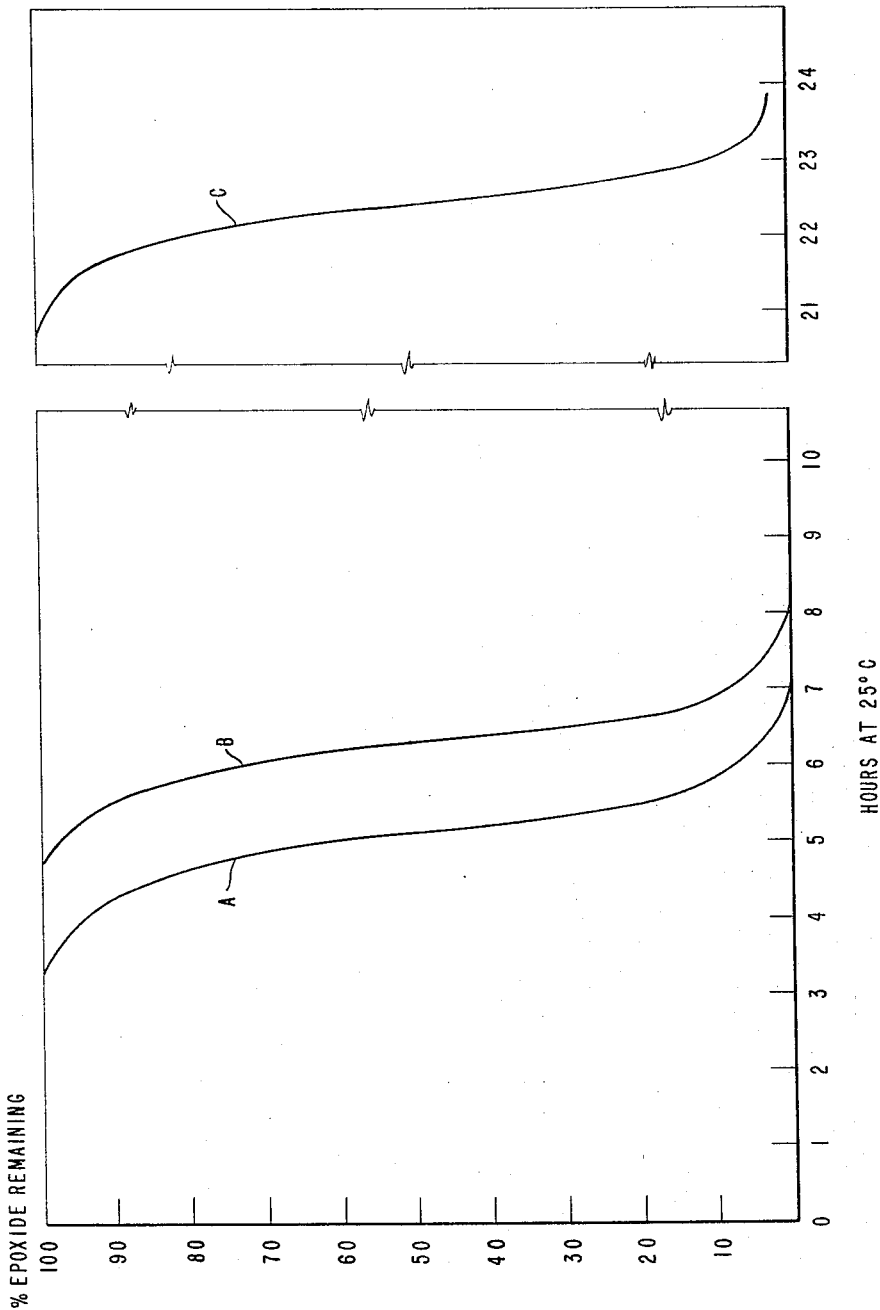
INVENTORS:
HERBERT A. NEWEY
PAUL A. DEVLIN
BY:
THEIR AGENT

3,291,776
PROCESS FOR CURING POLYEPOXIDES WITH POLYMERCAPTANS
Herbert A. Newey, Lafayette, and Paul A. Devlin, Orinda, Calif., assignors to Shell Oil Company, New York, N.Y., a corporation of Delaware
Filed Oct. 26, 1962, Ser. No. 233,244
16 Claims. (Cl. 260—47)

This invention relates to the cure of polyepoxide with mercaptans and to the resulting products. More particularly, the invention relates to the cure of polyepoxides with mercaptans using a special class of accelerator, and to the resulting cured products.

Specifically, the invention provides a new process for curing and resinifying polyepoxides having terminal epoxy groups and preferably the glycidyl polyethers of polyhydric phenols or alcohols, with polymercaptans, which provides a system having an extended pot life followed by rapid cure at low temperatures to the insoluble infusible state. The process comprises mixing and reacting the polyepoxide with a polymercaptan in the presence of an added special activator comprising an organic sulfide. The invention further provides cured products obtained by the above-described process.

It is known that the reaction of polyepoxides with polymercaptans by themselves gives only linear polymers substantially free of cross-linked materials. It is also known that the addition of amines to the mixture of polyepoxides and mercaptans causes the mixture to cure. With the amines, however, the compositions set up very rapidly even at low temperatures and there is little time available for working with the compositions. In addition, it is undesirable to utilize the amines in certain applications, such as in the preparation of rocket binders, where they come in contact with materials, such as perchlorates, with which they react.

It is an object of the invention to provide a new process for curing polyepoxides. It is a further object of the invention to provide a new process for curing polyepoxides with polymercaptans. It is still a further object to provide a method for curing polyepoxides having terminal epoxy groups with polymercaptans that provides a long pot life followed by a fast rate of cure at low temperatures. It is a further object to provide a new class of accelerators for the polymercaptan cure of polyepoxides. It is a further object to provide a new class of accelerators for polymercaptans which are not highly reactive with oxidizers, such as perchlorates. It is a further object to provide new compositions which have extended pot life but cure rapidly at the conclusion of the induction period. It is a further object to provide new compositions which can be cured at a fast rate to form tough, flexible insoluble infusible products. These and other objects of the invention will be apparent from the following detailed description thereof.

It has now been discovered that these and other objects are accomplished by the process of the invention comprising mixing and reacting the polyepoxide having terminal epoxy groups with a polymercaptan, and preferably a polymercaptan obtained by reacting a polyepoxide with hydrogen sulfide, and an added activator comprising an organic sulfide. It has been found that when the polymercaptans are used in combination with the added organic sulfides the mixture remains inactive (as indicated by lack of disappearance of epoxy groups) for an extended period of time. At the conclusion of this period, the mixture then cures at a rapid rate even at low temperatures to form a tough, flexible insoluble infusible product. The period of inactivity or "pot life" of the mixture can be easily adjusted by selection of the type and amount of organic sulfide. Thus, the invention provides for the first time a new and attractive means for preparing epoxy resin compositions of controlled pot life which can then be made to cure at a rapid rate at low temperatures.

The polyepoxides to be used in the process of the present invention comprise those materials possessing more than one terminal vicinal epoxy group, i. e., more than one

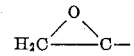

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of unsaturated monohydric alcohols and polycarboxylic acids, such as, for example, di(3,4-epoxybutyl) adipate, di(3,4-epoxybutyl) oxalate, di(2,3-epoxypropyl) succinate, di-(3,4-epoxybutyl, maleate, di(2,3-epoxypropyl) pimelate, di(2,3-epoxypropyl) phthalate, di,2,3-epoxypropyl) tetrahydrophthalate, di(4,5-epoxypentyl) maleate, di(2,3-epoxypropyl) trephthalate, di(4,5-epoxypentyl) thiodipropionate, di(5,6-epoxyhexyl) diphenydicarboxylate, di(3,4-epoxybutyl) sulfonyldibutyrate, tri(3,4-epoxybutyl) 1,2,4-butanetricarboxylate, di(5,6-epoxyhexyl) tartarate, di(4,5-epoxypentyl) maleate, di(2,3-epoxypropyl) azelate, di-(3,4-epoxybutyl) citrate, di(5,6-epoxyhexyl) cyclohexane-1,2-dicarboxylate, di(4,5-epoxypentyl)malonate.

Another group of the epoxy-containing materials includes those epoxidized esters of unsaturated alcohols and unsaturated carboxylic acids, such as 2,3-epoxybutyl 4,5-epoxypentanoate, 3,4-epoxybutyl, 4,5-epoxypentanoate, 3,4-epoxybutyl 3,4-epoxycyclohexanoate, 3,4-epoxybutyl 7,8-epoxyoctanoate, 2,3-epoxypropylcyclohexyl 2,3-epoxypropylcyclohexane carboxylate.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value of 0.514 eq./100 g.) and the like and mixtures thereof.

The polymercaptan to be reacted with the above-described polyepoxides may be any material or materials having at least two reactive mercapto —SH groups. They may be aliphatic, cycloaliphatic, aromatic or heterocyclic, saturated or unsaturated and may be monomeric or polymeric. In addition, they may, and preferably do in some instances, contain sulfur and/or oxygen ether linkages within their molecule, and may be substituted with non-interfering substituents, such as halogen atoms, hydroxyl groups, and the like.

The monomeric type polymercaptans may be exemplified by the following: 1,5-pentanedithiol, 1,4-butanedithiol, 1,4-cyclohexanedithiol, 1,2,4-butanetrithiol, dimercapto diethylformal ($HSC_2H_4OCH_2OC_2H_4SH$), 1,7-decanedithiol, 3,3'-thiodipropanethiol, 4,4'-thiodihexanethiol, 3,3'-oxydipropanethiol, 4,6-dithio-1,8-decanedithiol, 4,6-disulfonyl - 1,8-octanedithiol, 4-hydroxy-1,6-octanedithiol, 1,6 - octanedithiol, HSSH, 1,3 - benzenedithiol, 1,3,5-benzenetrithiol, 2-chloro-1,5-benzenedithiol, tetrahydropyran-2,3 - dipropanethiol, dihydrofuran-2,5 - dibutanethiol, sulfolane - 2,5 - dihexanethiol, furan-2,5-dibutanethiol, 3-hydroxy-dihydropyran-2,5-dioctanethiol, and the like.

Preferred monomeric-type polymercaptans to be used in the process comprise the aliphatic dithiols containing from 2 to 18 carbon atoms and the heterocyclic dithiols containing from 7 to 20 carbon atoms. Particularly preferred polythiols are the alkanedithiols and alkenedithiols containing from 2 to 15 carbon atoms, the thiodialkanethiols, thiodialkenethiols, oxydialkanethiols, and oxydialkenethiols containing from 2 to 16 carbon atoms, and the heterocyclic polythiols of the formula HSRXRSH wherein X is a furan, dihydrofuran, tetrahydrofuran, pyran, dihydropyran and tetrahydropyran ring or their substituted derivatives and R is a bivalent aliphatic hydrocarbon radical.

Coming under special consideration, particularly because of the outstanding properties of their resulting compositions as additives for surface coating compositions and adhesive properties, are the alkanedithiols, thiodialkanethiols and oxydialkanethiols containing from 2 to 15 carbon atoms.

Polymeric-type polymercaptans may also be used in producing the novel products of the invention. One group of this type of polythiols comprises the polythiopolymercaptans obtained by treating polymercaptans, such as those described above, with agents, such as hydrogen peroxide or sodium peroxide. Polymers of the formula $HS(C_2H_4OCH_2OC_2H_4SS)_nC_2H_4OCH_2OC_2H_4SH$ may be obtained, for example, by reacting dimercapto diethyl formal with hydrogen peroxide. A more detailed description of the preparation of this type of polymer may be found in Patrick—U.S. 2,466,963.

Polythiopolymercaptans useful in the process of the invention may also be prepared by reacting an organic dihalide with sodium polysulfide to form a high molecular weight polymer containing a plurality of disulfide linkages and then depolymerizing or degrading that polymer, preferably by treating a water dispersion of the polymer with sodium hydrosulfide and sodium sulfite. Organic halides used for this purpose may be exemplified by ethylene dichloride, dichlorobutane, triglycol dichloride, glycerol dichlorohydrin, dichloroethyl formal, dichlorobutyl ether, dichloroethyl ether, dichloropropionic acid, and mixtures thereof. The molecular weight of the resulting polythiopolymercaptan may be controlled by regulating the proportions of reactants. A more detailed description of the preparation of these polymers may be found in Patrick— U.S. 2,466,963.

Polythiopolymercaptans having molecular weights below about 20,0000 and preferably below 12,000 are generally preferred. Particularly preferred polythiopolymercaptans are the liquid polythiopolymercaptans having a molecular weight between 300 and 4000.

Of special interest, particularly because of the excellent casting and potting properties of the resulting modified polyepoxide products, are the liquid polythiopolymercaptans prepared by reacting dichloroethyl formal, preferably in the presence of small quantities, e.g. 1%, 2%, or 3%, of trifunctional products as trichloropropane, with sodium polysulfide and then treating a water dispersion of the polymer with sodium hydrosulfide and sodium sulfite to give products of a molecular weight between 300 and 10,000 and more preferably between 300 and 4000.

Still another type of polymercaptans that can be used to produce the novel products comprises the polymercaptans obtained by reacting any of the above-described polyepoxides with an excess of hydrogen sulfide. The polythiols obtained by reacting the glycidyl polyethers of the dihydric alcohols with an excess of hydrogen sulfide are particularly preferred. A preferred method for making this type of polymercaptan is described in U.S. 2,633,458, and so much of that disclosure relative to the adducts and their preparation is incorporated herein by reference.

The organic sulfides used as accelerators in the process of the invention includes those organic compounds possessing a thio ether linkage, i.e., a —S— linkage, which is preferably attached to aliphatic carbon atoms. The organic sulfides may be aliphatic, cycloaliphatic or aromatic and may be saturated or unsaturated. They may also be substituted with other groups, such as OH groups, ether groups, ester linkages, and the like. They may also be monomeric or polymeric.

Examples of the organic sulfides include, among others, dibutyl sulfide, dioctyl sulfide, diethyl sulfide, dihydroxypropyl sulfide, dihydroxyhexyl sulfide, n-butyl n-hexyl sulfide, isopropyl tert-butyl sulfide, n-propyl phenyl sulfide, beta,beta' - dihydroxyhexyl sulfide, 1,4 - di(dihydroxypropylsulfide)benzene, dicyclohexyl sulfide, dichloro cyclohexyl sulfide, dimethoxybutyl sulfide, n-propyl tert-hexyl sulfide, octyl phenyl sulfide, diallyl sulfide, allyl phenyl sulfide, 2,5-dithia octane, 4,6-dithiaoctane, 3,5,7-trithiadodecane, didodecylsulfide and diphenyl sulfide, and the like.

Particularly preferred organic sulfides to be employed include the alkyl, alkenyl, aryl aralkyl and cycloalkyl sulfides and their hydroxyalkoxy and halogen-substituted derivatives, all of which preferably contain no more than 25 carbon atoms, and preferably from 2 to 12 carbon atoms.

According to the process of the invention, the polyepoxide is cured by admixing and reacting the material with the above-described polymercaptans and the organic sulfides. The amount of the polymercaptan to be used in the process will vary over a wide range. Good cures are obtained by reacting the polyepoxide with at least .8 equivalents of the polymercaptan up to about 1.5 equivalent. As used herein in relation to the amount of polymercaptan and polyepoxide, the expression "equivalent" amount refers to that amount of mercaptan needed to furnish one —SH group per epoxy group in the polyepoxide to be involved in the cure. To obtain the best results, the polymercaptan should be employed in about at least a chemical equivalent amount, and more preferably the polymercaptan and epoxide are combined in a chemical equivalent ratio of about 1:1.

The sulfide is needed only in small amounts. Excellent results are obtained when the sulfide is utilized in amounts varying from about 0.01% to 6% by weight of the polyepoxide and more preferably in amounts varying from 0.1% to 3% by weight of polyepoxide.

The polymercaptan and sulfide may be combined together before they are added to the polyepoxide or they may be added separately.

In executing the process of the invention, it is desirable to have the composition in a mobile liquid condition in order to facilitate mixing and utilization. Accordngly, with those polyepoxides that are liquid, but are too viscous for ready mixing, one may either heat to reduce viscosity or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition by evaporation before or during cure, such as ketones, esters, ether alcohols, chlorinated hydrocarbons, and the like. To save expense these active solvents may be used in admixture with aromatic hydrocarbons, such as benzene, toluene, xylene and/or alcohols. Solvents which remain in the cured composition may also be used, such as, for example, diethyl phthalate, dibutyl phthalate, or liquid monoepoxides, including glycidyl allyl ether, glycidyl phenyl ether, styrene oxide, and the like.

Particularly superior results are obtained when special diluents are employed including the liquid mercaptans which may be monomercaptans or polymercaptans. Especially preferred are the hydroxy-substituted diluents, such as 1,3-dithio-2-hydroxypropane as may be obtained by adding hydrogen sulfide to epichlorohydrin.

The cure may be effected over a wide range of temperatures. The cure may be accomplished, for example, by merely mixing the polyepoxide, polymercaptan and sulfide together in the presence of any desired solvents or diluents, and then letting the mixture stand at room temperature. In some applications, it may be desirable to effect a more rapid cure and this may be accomplished by raising the temperature. Excellent results are obtained at temperatures from 40° C. to 110° C. and these are preferred for many applications where heating is permissible. Temperatures much above 200° C. are generally not desirable but may be employed if necessary.

The curing agent-polyepoxide systems described above may be utilized in a great variety of important applications. They may be used, for example, in the preparation of coating compositions such as enamels and paints. In these applications, it is generally desirable to combine the polyepoxide with the polymercaptan and sulfide and other desired solvents, diluents and film-forming agents and then apply this mixture to the surface to be coated. The coatings may then be allowed to set at room temperature or heat may be applied.

The systems described above are also very useful in the preparation of pottings and castings. In this type of application, the mixture of polyepoxide, polymercaptan and sulfide is added to the desired mold or castings and then allowed to set at room temperature. Heat may be applied in some cases to hasten cure.

The above-described systems are also useful in the preparation of laminates. In this application, the sheets of fibrous materials are first impregnated with the mixture of polyepoxide, polymercaptan and sulfide. This is conveniently accomplished by dissolving the polymercaptan in a solvent, such as the liquid mercaptans and mixing this with the desired polyepoxide and sulfide to form a fluid mixture. The sheets of fibrous materials are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperatures such as about 50° C. to 200° C. with the impregnated sheet stock passing through or hanging free in an oven or other suitable equipment. The resinification is arrested before infusible products occur by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, canvas, and the like. It is usually preferred to utilize woven glass cloth that has been given prior treatment with well known finishing or sizing agents, therefore, such as chrome methylate or vinyl trichlorosilane.

The new compositions of the invention are particularly outstanding as adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc dust, Bentonite, ground glass fibers, Monetta clay and the like. These fillers are preferably used in amounts varying from about 10 parts to 200 parts per 100 parts of the polyepoxide, polymercaptan and organic sulfide. Other materials that may be included include other types of resins, such as phenol-aldehyde resins, urea-aldehyde resins, furfural resins polyacetal resins, carbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simply be spread on the desired surface to form films of various thicknesses, e.g., 0.5 mil to 30 mils, and then the other surface superimposed and heat applied. Curing pressures can be light contact pressures up to about 500 p.s.i.

When the compositions are used as adhesives for metal-to-metal bonding, it has sometimes been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperatures, but also retain good strength even though heated at quite elevated temperatures for long periods of time. A preferred tape for such use comprises a glass fiber textile impregnated or coated with a mixture of the polyepoxide, polymercaptan, organic sulfide and atomized aluminum powder or dust.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

*Example I*

This example illustrates the unexpected superior results obtained by use of 2,2'-thiodiethanol as an accelerator for the cure of mixtures containing a polyepoxide and a polyepoxide-hydrogen sulfide adduct.

10 parts of a polyglycidyl ether of 2,2-bis(4-hydroxyphenyl)propane (containing 12.5 parts butyl glycidyl ether) having an epoxy value of 0.52 eq./100 g. was mixed with 5.65 parts of a reaction product of hydrogen sulfide and a glycidyl ether of a phenol-formaldehyde resin (dissolved in 1.85 parts of 1,3-dithio-2-hydroxypropane) and .5 part of 2,2'-thiodiethanol as accelerator. The mixture was kept at 25° C. At that temperature, the mixture had set up to a hard insoluble infusible casting (epoxy value 0) at the end of 4–5 hours.

In a related experiment wherein the same mixture was employed without the use of the 2,2'-thiodiethanol, the mixture took over 24 hours to reach a low epoxy value.

*Example II*

This example illustrates the unexpected superior results obtained by addition of 2,2'-thiodiethanol to a mixture of a glycidyl polyether and a tetramercaptan.

100 parts of the polyglycidyl ether defined in Example I was combined with 32.6 parts of a tetramercaptan $$\text{HS}-\underset{\text{HS}-}{\bigcirc}-\underset{|}{\overset{\overset{\text{SH}}{|}}{\text{CH}}}-\overset{\overset{\text{SH}}{|}}{\text{CH}_2}$$

and 5 parts of 2,2'-thiodiethanol. The mixture was stirred and maintained at 25° C. The mixture set up to a hard insoluble infusible casting in 16 hours. In a related experiment using the same mixture without the 2,2'-thiodiethanol, the composition set up only after 7 days at 25° C.

*Example III*

This example illustrates the unexpected superior results obtained by addition of 2,2'-thiodiethanol to a mixture of a glycidyl polyether and a polymercaptan comprising pentaerythritol tetrathioglycolate.

100 parts of the polyglycidyl ether defined in Example I was combined with 62 parts of pentaerythritol tetrathioglycolate and 5 parts of 2,2'-thiodiethanol. The mixture was stirred and maintained at 25° C. This mixture set up to a hard insoluble infusible casting at the end of 24 hours. In a related experiment using the same mixture without the 2,2'-thiodiethanol, the composition set up only after 18 days at 25° C.

*Example IV*

This example illustrates the unexpected superior results obtained by adding dibutyl sulfide to a mixture of a glycidyl polyether and the hydrogen sulfide adduct defined in Example I.

10 parts of the glycidyl polyether defined in Example I was combined with 7.5 parts of the hydrogen sulfide adduct defined in Example I and .1 part of dibutyl sulfide. The resulting mixture was stirred and kept at 25° C. The course of the cure as indicated by the disappearance of epoxy groups is indicated in the attached Graph 1, line A. In a related experiment wherein the amount of dibutyl sulfide was reduced to .05 part, the cure was slower and was represented by line B in the graph. In a further related experiment using the same mixture without the organic sulfide, the mixture took 24 hours to set up at 25° C. (line C).

*Example V*

Examples I to IV are repeated with the exception that the accelerator employed is 3,3'-thiodipropanol. Related results are obtained.

*Example VI*

Examples I to IV are repeated with the exception that the accelerator employed is N-propyl phenyl sulfide. Related results are obtained.

*Example VII*

Example I is repeated with the exception that the polymercaptan is a reaction product of hydrogen sulfide and glycidyl ether of 2,2-bis(4-hydroxyphenyl)propane. Related results are obtained.

*Example VIII*

Example I is repeated with the exception that the polyepoxide employed is as follows: glycidyl ether of resorcinol, glycidyl ether of 2,4,6-triglycidylphenol, and the glycidyl ether of 1,1,5,5-tetrakis(hydroxyphenyl)pentane. Related results are obtained.

We claim as our invention:

1. A process for curing a polyepoxide having more than one vic-epoxy group and selected from the group consisting of glycidyl polyethers, polyhydric phenols and glycidyl polyethers of polyhydric alcohols with at least .8 equivalents of a liquid aliphatic or six-membered cycloaliphatic polymercaptan having a molecular weight less than about 3,000 in contact with from .05% to 5% by weight of an organic sulfide of the formula R—S—R wherein R is a member of the group consisting of aliphatic hydrocarbon radicals, six-membered cycloaliphatic hydrocarbon radicals, aromatic hydrocarbon radicals and derivatives of the foregoing wherein at least one of the hydrogens has been replaced by an OH radical, said organic sulfide having no more than 25 carbon atoms.

2. A process as in claim 1 wherein the polymercaptan is a reaction product of a polyepoxide and hydrogen sulfide.

3. A process as in claim 1 wherein the polymercaptan is a liquid polythiopolymercaptan of the general formula $$HSC_2H_4OCH_2OC_2H_5(SSC_2H_4OCH_2OC_2H_4)_nSH$$

wherein $n$ is an integer from 1 to 5.

4. A process as in claim 1 wherein the polymercaptan is an alkylenedithiol containing from 3 to 12 carbon atoms.

5. A process as in claim 1 wherein the organic sulfide is a dialkyl sulfide.

6. A process as in claim 1 wherein the organic sulfide is a hydroxy-substituted dialkyl sulfide.

7. A process as in claim 1 wherein the organic sulfide is dibutyl sulfide.

8. A process as in claim 1 wherein the polyepoxide is a glycidyl polyether of 2,2-bis(4-hydroxyphenyl)propane having a molecular weight between 250 and 900.

9. A process for curing a glycidyl polyether of a polyhydric phenol which comprises mixing and reacting the glycidyl polyether with from .8 to 1.5 equivalents of a liquid aliphatic polymercaptan having a molecular weight less than about 3,000 in contact with 0.05% by 5% by weight of an organic sulfide of the formula R—S—R wherein R is a member of the group consisting of aliphatic hydrocarbon radicals, six-membered cycloaliphatic hydrocarbon radicals, aromatic hydrocarbon radicals, and derivatives of the foregoing members wherein at least one hydrogen atom has been replaced by an OH radical, said sulfide containing from 2 to 25 carbon atoms.

10. A process as in claim 9 wherein the sulfide is thiodipropanol.

11. A process as in claim 9 wherein the sulfide is thiodiethanol.

12. A process for preparing a resinified product which comprises mixing and reacting a polyepoxide having more than one vic-epoxy group and selected from the group consisting of glycidyl polyethers of polyhydric phenols and glycidyl polyethers of polyhydric alcohols with a liquid aliphatic or six-membered cycloaliphatic polymercaptan having a molecular weight less than 3,000 in contact with from .05% to 5% by weight of an added organic sulfide of the formula R—S—R wherein R is a member of the group consisting of aliphatic hydrocarbon radicals, six-membered cycloaliphatic hydrocarbon radicals, aromatic hydrocarbon radicals, and derivatives of the foregoing members wherein at least one of the hydrogen carbon atoms has been replaced by an OH group.

13. A composition having an improved pot life but capable of rapid conversion to a cured product comprising a mixture of a polyepoxide having more than one vic-epoxy group and selected from the group consisting of glycidyl polyethers of polyhydric phenols and glycidyl polyethers of polyhydric alcohols, a liquid aliphatic or six-membered cyclic aliphatic polymercaptan having a molecular weight less than 3,000, and from .05% to 5% by weight of an organic sulfide of the formula R—S—R wherein R is a member of the group consisting of aliphatic hydrocarbon radicals, six-membered cycloaliphatic hydrocarbon radicals, aromatic hydrocarbon radicals and derivatives of the foregoing wherein one of the hydrogen atoms has been replaced by an OH radical.

14. A composition as in claim 13 wherein the sulfide is a dialkyl sulfide.

15. A composition as in claim 13 wherein the sulfide is a hydroxy substituted dialkyl sulfide.

16. A cured composition comprising the reaction product of (1) a polyepoxide having more than one vic-epoxy group and selected from the group consisting of glycidyl polyethers of polyhydric phenols and glycidyl polyethers of polyhydric alcohols, (2) a liquid aliphatic or six-membered cyclic aliphatic polymercaptan having molecular weight of less than 3,000, and (3) from .05% to 5% by weight of an organic sulfide of the formula R—S—R wherein R is a member of the group consisting of aliphatic hydrocarbon radicals, six-membered cyclohydrocarbon radicals, aromatic hydrocarbon radicals, and derivatives of the foregoing wherein one of the hydrogen atoms has been replaced by an OH radical.

References Cited by the Examiner

UNITED STATES PATENTS

| 2,789,958 | 4/1957 | Fettes et al. | 260—47 |
| 2,915,485 | 12/1959 | Shokal | 260—47 |

WILLIAM H. SHORT, *Primary Examiner.*

T. D. KERWIN, *Assistant Examiner.*